United States Patent Office 3,542,719
Patented Nov. 24, 1970

---

3,542,719
PROCESS FOR PREPARING POLY(1,4-BENZ-AMIDE) IN SITU IN A POLYACRYLIC SOLUTION
Harold Pollack, Claymont, Del., assignor to E. I. du Pont de Nemours and Company, Wilmington, Del., a corporation of Delaware
No Drawing. Filed July 24, 1968, Ser. No. 747,124
Int. Cl. C08f 37/18; C08g 20/08, 51/44
U.S. Cl. 260—32.6      10 Claims

---

ABSTRACT OF THE DISCLOSURE

Process for preparing poly(1,4-benzamide) in situ in a polyacrylic solution by polymerizing para-aminobenzoyl chloride hydrochloride therein. Preferred liquid media, salts, neutralizing agents, and polymerization conditions are disclosed. The resultant polymeric dope is useful in preparing poly(1,4-benzamide) reinforced, polyacrylic matrix, shaped articles. In particular, fibers so prepared, have a significantly improved hot-wet initial modulus.

---

This invention relates to reinforced polymeric compositions and, in particular, to processes for preparing such compositions and shaped articles thereof.

BACKGROUND OF THE INVENTION

It is know to modify the tensile properties of filaments formed of synthetic organic polymers by incorporating finely divided particles of incompatible synthetic organic polymers or inorganic material therein. The degree of reinforcement achieved is generally determined by the strength of the reinforcing material as well as its ability to adhere to the matrix polymer. Organic polymers commonly employed for reinforcement applications exhibit adequate adhesion to the matrix, but do not possess the strength and creep resistance required to achieve a substantial degree of tensile reinforcement, especially at temperatures above 90° C. under wet conditions. Although inorganic materials, such as glass, metal, and refactory oxides possess the required strength and modulus, these properties are often not transmitted to the composite fiber due to the low degree of adhesion between reinforcing agent and matrix. When the fibers are drawn to orient the matrix polymer and develop optimum tensile properties, the poor adhesion often results in the formation of voids and deterioration of the internal structure.

A particularly important problem in the polyacrylic fiber field concerns the low initial modulus (Mi) of such fibers under hot-wet conditions. Since fabrics are treated under such conditions (e.g., dyeing), this property is most significant. Mi values (at 90° C. and 100% relative humidity) of 1.0 gram/denier, and even lower, are common, although such low values are highly undesirable.

This invention provides processes for preparing polymer compositions comprising fiber-forming matrix polymer and high modulus reinforcing polymer that is immiscible or only slightly miscible with the matrix polymer. These compositions can be extruded to form shaped articles, and in particular, textile denier fiber that exhibit higher resistance to heat and moisture when compared with fibers in which the reinforcing polymer is absent. The reinforcing polymer is uniformly dispersed throughout the length and cross-section of the fiber in the form of microscopic particles exhibiting a maximum dimension less than about 1.0 micron, and L/W (length/width) ratio greater than about 2/1.

SUMMARY OF THE INVENTION

The present invention provides a process for preparing poly(1,4-benzamide) as the reinforcing polymer in a polyacrylic matrix. The process comprising:

(1) Forming a solution of fiber-forming polyacrylic in a liquid medium, (2) Dispersing up to about 53 parts by weight, per 100 parts by weight of said polyacrylic, of para-aminobenzoyl chloride hydrochloride, in the solution, and (3) Maintaining the temperature of the resulting mixture below 60° C. to polymerize said para-aminobenzoyl chloride hydrochloride to form poly(1,4-benzamide). The mixture preferably contains an alkali metal salt, such as lithium chloride, added prior to the polymerization reaction. The liquid medium utilized is preferably N,N,N',N'-tetramethylurea or N,N-dimethylacetamide. The acidic polymerization reaction byproduct, HCl, is preferably neutralized with a suitable base (e.g., lithium carbonate). The viscosity of the resultant mixture is adjusted, by concentration, etc., as may be necessary to obtain a useful dope (i.e., a polymeric composition suitable for forming shaped articles by fibridation, casting films, extruding fibers, etc.). The dope is not necessarily a true solution; it may be opaque and be comprised of more than one phase.

DETAILED DESCRIPTION OF THE INVENTION

The present process is applicable to a wide variety of polyacrylics. The term "polyacrylic" includes any long-chain synthetic polymer comprised of at least 85 percent by weight of acrylonitrile units of the formula

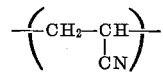

as an integral part of the polymer chain. As is well understood, the term includes the homopolymer of acrylonitrile and copolymers of acrylonitrile and monoethylenically unsaturated monomers copolymerizable with acrylonitrile. Preferred comonomers include styrene, 2-vinylpyridine, 2-methyl-5-vinylpyridine, 4-vinylpyridine, methyl acrylate, sodium styrene sulfonates, vinylidine chloride, vinyl acetate, methyl vinyl ketone, methyl methacrylate, dimethyl itaconate, butyl methacrylate, butyl acrylate, diethyl maleate, vinyl trimethyl acetate, methacrylonitrile, vinyl ethyl hexyl ether, octyl methacrylate, alpha-methylstyrene, 4-methoxy styrene, ethylene sulfonic acid, allylsulfonic acid, methallylsulfonic acid, halogenated monoethylenic compounds, N-vinyl compounds, and the like. One or more copolymerizable compounds may be used as desired. Neutral monomers alone may be used to give better dyeing by virtue of opening up the polymer structure but preferred copolymers are those that contain both a neutral modifier and a strong acid group such as acrylonitrile (85–95%), together with methyl acrylate, vinyl acetate, and methyl vinyl ketone (14–4%) and a copolymerizable sulfonate such as sodium or potassium styrene sulfonate (0.1–5%). Polyacrylics having an inherent viscosity ($\eta_{inh}$) determined as described hereinafter, of greater than about 0.5 measured in N,N-dimethyl formamide (DMF) are fiber-forming.

A solution of the fiber-forming polyacrylic in a liquid medium is formed. Among the suitable liquid media, N,N,N',N'-tetramethyl urea (TMU) and N,N-dimethylacetamide (DMAc) are most preferred. The liquid medium used must be a solvent for the polyacrylic matrix polymer and a polymerization medium for the monomeric precursor of poly(1,4-benzamide).

Up to about 53 parts by weight of para-aminobenzoyl chloride hydrochloride, per 100 parts by weight of the polyacrylic is added (preferably uniformly dispersed) to the liquid medium. The addition is designed to result in a polymeric composition of up to about 25% by weight of the reinforcing polymer, based on the total polymer content (i.e., matrix and reinforcing polymer). To facilitate optimum polymerization of the para-aminobenzoyl chloride hydrochloride and formation of a homogeneous poly(1,4-benzamide) composition, the concentration of the matrix polymer in the polymerization system should be less than about 15% by weight, based on the total weight of mixture.

The addition of a salt, such as lithium chloride to the reaction mixture is highly preferred, in that it aids in the stabilization of the mixture. In particular, the addition of such a salt, is necessary to prevent "gelling" of the polymerization mixture formed. When the low-temperature polymerization technique is conducted (as described hereinafter) the polymer usually attains a useful molecular weight after the polymerization has proceeded for about 15 minutes to an hour or even longer. Gelling may begin to occur in from about 0.5 to 2 hours reaction time, depending in part at least upon the degree of polymerization attained and the particular liquid medium. Such gelling can be prevented by adding a quantity of lithium chloride (or a lithium chloride salt-forming reagent) prior to the polymerization or within the first 0.5 hour of the reaction. A preferred composition, wherein hte liquid medium is TMU or DMAc, includes at least 0.5 mole (preferably 2 to 8 moles) of lithium chloride for each mole of para-aminobenzoyl chloride hydrochloride.

If the polymerization mixture begins to gel, the gel can generally be eliminated by the addition of lithium chloride without any adverse effects. The polymerization mixture should, however, not be completely gelled. If such gelation occurs, although the gelled mixture may be reduced in particle size to form a chemically identical composition, the physical characteristic (e.g., reinforcing particle size) of the resultant shaped article may be different.

The polymerization is effected by maintaining an environmental temperature of less than 60° C., preferably from 0° to 25° C., and preferably with stirring, until substantially complete polymerization has occurred (usually about one hour). Due to the relatively low concentration of monomer (generally less than about 8% by weight based upon the total weight of the dispersion) the chain-stopping agents frequently employed to control the molecular weight of poly(1,4-benzamide) are not required. However, chain-stopping agents, such as p-amino benzoic acid, may be added if desired. Water, itself, may function as a chain-stopping agent and, therefore, for the attainment of the highest molecular weights the polymerizations are performed under strictly anhydrous conditions. The reaction vessel and auxiliary equipment, solvents, and reactants are preferably dried prior to use and the reaction vessel is continuously swept with a stream of dry, inert gas, e.g., nitrogen, during the polymerization.

The polymerization should be continued until the poly(1,4-benzamide) has an inherent viscosity ($\eta_{inh}$) of at least about 0.6, determined as described hereinafter, in concentrated (95–98°% sulfuric acid at 30° C. Generally homopolymeric poly(1,4-benzamide) itself can be spun into useful fibers at $\eta_{inh} > 0.80$. When poly(1,4-benzamide) is used, as herein, as a reinforcing polymer, the inherent viscosity may be somewhat lower, although it must be high enough to maintain the fiber-forming properties of the matrix/reinforcing polymer mixture and high enough to contribute useful property improvement to fibers prepared from the polymer mixture when compared to the unmodified matrix polymer.

The polymerization reaction produces hydrogen chloride as an acidic by-product. It is preferable, although not mandatory, to neutralize this by-product since it may corrode conventional processing equipment (e.g., the spinneret). Among the suitable neutralizing agents, lithium hydroxide and lithium carbonate are most preferred in that lithium chloride results from the neutralization. The neutralization is preferably effected following completion of the polymerization, otherwise the water formed in neutralization could partially hydrolize the monomer or the end groups of the growing polymer chains to yield a product of low molecular weight.

Upon completion of polymerization the reaction mixture can be concentrated or diluted to achieve a viscosity suitable for the type of spinning desired. Concentration is preferably carried out under reduced pressure at temperatures up to 130° C.

A preferred composition (or dope) contains about 15–25% by weight of the matrix polymer (based on the total composition), and about 5–25% by weight of the reinforcing polymer (based on the weight of the matrix polymer). The solvent is preferably TMU or DMAc, preferably containing lithium chloride.

The previously described matrix/reforcing polymer compositions can be cast into self-supporting films, extruded into fibers by conventional procedures (both wet and dry-spinning methods may be employed) or formed into fibrids by shear-precipitation techniques (e.g., as described in Morgan U.S. 2,999,788). These compositions can be used as liquid coating compositions which are applied to a variety of substrates which may be in the form of sheets, paper, wires, string, fibers, other solid or microporous objects, etc.

Use of these compositions to form wet- or dry-spun fibers is most preferred. To develop maximum tensile strength and modulus, the as-spun fibers are preferably drawn to develop maximum orientation of the polymer molecules along the fiber axis. Such drawn fibers are characterized by their improved hot-wet initial modulus. Although the invention is not to be limited by the theoretical considerations involved, it is believed that the in situ polymerization of poly(1,4-benzamide) results in a unique type of solid poly(1,4-benzamide) phase in the resultant fiber. Examination of the resultant fibers under an electron microscope indicates that such particles are acicular having a maximum dimension less than about 1.0 micron and $L/W$ (length/width) ratio of greater than about 2:1. The poly(1,4-benzamide) particles size in fibers prepared by other methods is generally characterized by a maximum dimension up to about 10 microns.

EXAMPLES

The following non-limitative examples are illustrative of the practice of preferred embodiments of this invention. Fiber properties of tenacity, elongation and initial modulus, are coded as T/E/Mi, and expressed in units of grams/denier, percent and grams/denier, respectively. Parts and percentages are by weight unless otherwise indicated.

In these examples, inherent viscosity ($\eta_{inh}$) is determined in accordance with the following equation:

$$\eta\ \text{inh} = \frac{\ln(\eta_{rel})}{c}$$

wherein ($\eta_{rel}$) represents the relative viscosity and ($c$) represents a concentration of 0.5 gram of the polymer in 100 ml. of the solvent. The relative viscosity ($\eta_{rel}$) is determined by dividing the flow time in a capillary viscometer of a dilute solution of the polymer by the flow time for the pure solvent. Unless otherwise specified, the dilute solutions used herein for determining ($\eta_{rel}$) are of the concentration expressed by ($c$) above; flow times are determined at 30° C., using concentrated (95–98%) sulfuric acid as a solvent.

Example I

A polymer composition is prepared by dissolving 45 g. of the matrix copolymer containing 93.6% by weight of acrylonitrile, 6% by weight of methyl acrylate and 0.4% by weight of sodium styrene sulfonate units in 408 g. of a 2% by weight solution of lithium chloride in TMU. This is combined with 20 g. of p-amino benzoyl chloride hydrochloride. The resultant mixture is stirred for about one hour at ambient temperature to polymerize the said monomer in about 70% yield and obtain a homogenous system. The reaction mixture is then heated to a temperature of 50° C. and neutralized using 9 g. of lithium carbonate. Water and excess TMU are then removed to concentrate it to a consistency suitable for wet spinning and the composition is wet spun at room temperature through a 100-hole spinneret having orifice diameters of 0.003 inch (0.076 cm.). The spinning bath comprises a 1:4 by volume mixture of dimethylformamide:water and is held at a temperature of 65° C. After being drawn 4.5× at 130° C. on a hot plate the tensile properties, T/E/Mi, of the fiber, at 70° F. (21°/C.) 65% relative humidity (R.H.), are 2.5/13/90. At 194° F. (90° C.) and 100% R.H., these values are 0.7/19/6. These values are summarized in Table I and compared with an unreinforced "control" fiber entirely of the matrix polymer of Example I, prepared by the general procedure thereof but drawn 6×. The inherent viscosities of the polymers are also listed. Inherent viscosity measurements of the poly(1,4-benzamide) are made by precipitating a sample of the polymer from the final reaction composition, extracting the matrix copolymer using DMF and then measuring the viscosity of the solid residue in the usual manner.

Example II

The quantities of matrix copolymer, solvent and p-aminobenzoyl chloride hydrochloride are the same as for Example I. N,N-dimethyl acetamide (DMAc) is substituted for the TMU of Example I. The polymerization is carried out as in Example I and the composition is wet spun through a 10-hole spinneret having an orifice diameter of .005 inch (.127 cm.) using a head temperature of 21° C. The spinning bath comprises a 1:1 mixture of DMAc:water at 70° C. After being drawn 3× at 140° C. the tensile properties, T/E/Mi of the fibers at 21° C. and 65% R.H., are 1.01/6/45.5. At 194° F. (90° C.) and 100% R.H., these values are 0.2/17.7/3.6. These values are summarized in Table I. The inherent viscosities of the polymers are also listed.

Example III

This example, not of this invention, ilustrates prepared poly(1,4-benzamide) which is dissolved in a solvent containing polyacrylonitrile.

Poly(1,4-benzamide) is prepared by dispersing 192 g. (1 mole) of p-amino benzoyl chloride hydrochloride in about 980 g. of TMU containing 20 g. of lithium chloride. The TMU is stirred and initially cooled to a temperature of 0–5° C., after which the temperature is allowed to reach about 25° C. as the polymerization proceeds. When the desired viscosity level is attained, which requires about 30 minutes, the reaction is terminated by adding 3 cc. of acetyl chloride, after which the hydrogen chloride is neutralized using lithium carbonate. The water formed during neutralization is removed by heating the reaction mixture under reduced pressure. A portion of this mixture containing 10 g. of poly(1,4-benzamide) is combined of 93.6% by weight of acrylonitrile, 6% methyl acrylate and 0.4% sodium styrene sulfonate units, the copolymer being dissolved in 160 g. of N,N-dimethylformamide. The mixture is dry spun through a 10-hole spineret having orifice diameters of 0.004 inch (0.0 cm.). The temperature of the spinning solution is 130° C., the ttemperature of the nitrogen on the downstream side of the spinneret is 198–208° C. and the rate of nitrogen flow is 4.75 cu. ft./minute (1.35x10⁵ cu. cm./min.). The fibers are wound up at a speed of 121 yd./min., (110 meters/min.), drawn 5× over a hot plate at 140° C. and heat treated. The tensile properties, T/E/Mi, of the resultant fiber, measured at 21° C., and 65% relative humidity (R.H.) are 2.0/12/55 and at 90° C., and 100% R.H. are 0.4/35/2.5. These values are summarized in Table I.

TABLE I

| Example | Tenacity (g./denier)[1] | Elongation (percent)[1] | Initial modulus (g./d.)[1] | Reinforcing polymer ($\eta_{inh}$) | Matrix polymer ($\eta_{inh}$) |
|---|---|---|---|---|---|
| I | 2.5/0.7 | 13/19 | 90/6 | 1.12 | 1.4 |
| II | 1.0/0.2 | 6/17.7 | 45/3.6 | | 1.4 |
| Control | 3.2/0.8 | 32/140 | 58/1.0 | | 1.4 |
| III | 2.0/0.4 | 12/35 | 55/2.5 | 1.2 | 1.4 |

[1] 21° C./90° C., 65% R.H./100%.R.H.

The poly(1,4-benzamide) particle size in the resultant fibers of Examples I and III is examined under an electron microscope, and the values for length and width (L and W) respectively are given in Table II. As Table II indicates, a smaller length is measured in Example I (in situ polymerization of this invention) than in Example III (combined pre-formed polymer solutions).

TABLE II

| Example | Maximum dimension (length) of reinforcing polymer | Second largest dimension (width) of reinforcing polymers | L/w, length/width |
|---|---|---|---|
| I | 0.25 | 0.127 | 2/1 |
| III | 1.0 | 1.0 | 1/1 |

What is claimed is:
1. Process for preparing poly(1,4-benzamide) in situ in a polyacrylic solution comprising:
  (1) forming a solution of fiber-forming polyacrylic long chain synthetic polymer, comprised of at least 85% by weight of acrylonitrile units of the formula

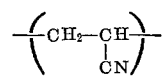

as an integral part of the polymer chain, in a liquid medium,
  (2) dispersing up to about 53 parts by weight, per 100 parts by weight of said polyacrylic, of paraaminobenzoyl chloride hydrochloride, in the polyacrylic solution, and
  (3) maintaining the temperature of the resultant mixture below 60° C. to polymerize the paraaminobenzoyl chloride hydrochloride to form poly(1,4-benzamide).

2. Process, according to claim 1, wherein said liquid medium is an amide selected from the group consisting of N,N,N',N'-tetramethyl urea and N,N-dimethylacetamide.

3. Process, according to claim 2, wherein said liquid medium has dispersed therein, at least 0.5 mole of lithium chloride per mole of para-aminobenzoyl chloride hydrochloride.

4. Process, according to claim 3, wherein said polyacrylic constitutes less than about 15 percent by weight of the total mixture.

5. Process, according to claim 4, further comprising stirring said resultant mixture, while maintaining the temperature between about 0° and 25° C.

6. Process, according to claim 5, wherein the polymerization is continued until the poly(1,4-benzamide) has an inherent viscosity greater than about 0.6 as measured in concentrated (95–98%) sulfuric acid at 30° C.

7. Process, according to claim 6, further comprising adding a neutralizing agent to the mixture following substantial completion of the polymerization in amounts sufficient to neutralize the acid by-product of the polymerization reaction.

8. Process, according to claim 7, further comprising, adjusting the concentration of the liquid medium in the neutralized mixture to provide a dope comprising:
 (1) 15 to 25% by weight of the polyacrylic, based upon the total dope weight, and
 (2) 5 to 25% by weight of poly(1,4-benzamide), based upon the weight of the polyacrylic.

9. Process, according to claim 8, further comprising, forming a shaped article from the dope.

10. Process, according to claim 8, further comprising, spinning a fiber from the dope.

References Cited

UNITED STATES PATENTS 3,472,819  10/1969  Stephens _____ 260—78

MORRIS LIEBMAN, Primary Examiner

R. ZAITLEN, Assistant Examiner

U.S. Cl. X.R.

260—37, 78, 857, 898